United States Patent
Shih et al.

(10) Patent No.: US 9,075,481 B2
(45) Date of Patent: Jul. 7, 2015

(54) ESD DETECTION ON A TOUCH INPUT DEVICE

(71) Applicant: Apple Inc., Cupertino, CA (US)

(72) Inventors: David H. C. Shih, Sunnyvale, CA (US); Albert Lin, Sunnyvale, CA (US); Sean Erik O'Connor, Palo Alto, CA (US); Ari Y. Benbasat, San Francisco, CA (US); Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/710,318

(22) Filed: Dec. 10, 2012

(65) Prior Publication Data

US 2014/0071092 A1   Mar. 13, 2014

Related U.S. Application Data

(60) Provisional application No. 61/699,176, filed on Sep. 10, 2012.

(51) Int. Cl.
| | | |
|---|---|---|
| *G06F 3/041* | (2006.01) | |
| *G06F 3/042* | (2006.01) | |
| *G06F 3/043* | (2006.01) | |
| *G06F 3/044* | (2006.01) | |
| *G06F 3/045* | (2006.01) | |
| *G06F 3/046* | (2006.01) | |
| *G06F 3/047* | (2006.01) | |

(52) U.S. Cl.
CPC ............. *G06F 3/0425* (2013.01); *G06F 3/044* (2013.01)

(58) Field of Classification Search
USPC .......... 345/173–178; 178/18.01–18.09, 18.11
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Charles V Hicks
*Assistant Examiner* — Jeffrey S Steinberg
(74) *Attorney, Agent, or Firm* — Morrison & Foerster LLP

(57) ABSTRACT

A touch sensitive device that detects the occurrence of an electrostatic discharge event on the device by analyzing an acquired touch image for characteristics associated with the occurrence of an ESD event is provided. An acquired touch image is analyzed for characteristics that differentiate it from a touch image generated by a user input and are correlated with an expected touch image generated by an ESD event.

30 Claims, 13 Drawing Sheets

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,493,331 | B2 * | 7/2013 | Krah et al. .................. 345/173 |
| 2006/0026521 | A1 | 2/2006 | Hotelling et al. |
| 2006/0197753 | A1 | 9/2006 | Hotelling |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

ESD DETECTION ON A TOUCH INPUT DEVICE

FIELD OF THE DISCLOSURE

This relates generally to the use of specialized sensors placed in various locations on a touch input device to detect for the presence of an electrostatic discharge (ESD) event occurring on the device.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can generate touch images and then interpret the touch images in accordance with the display appearing at the time of the touch event, and thereafter can perform one or more actions based on the touch image.

Electronic devices in general can be susceptible to electrostatic discharge (ESD) events, which in general are caused by objects external to the device imparting electrostatic energy onto the device. In the instance of touch input devices, ESD events can generate a "false touch" on the touch screen; in other words, the device will think that a touch or proximity event has occurred when none exists. Furthermore, ESD events can also cause a device to ignore an actual touch or proximity event. For example, mutual capacitance touch sensor panels can be formed from a matrix of drive and sense lines of a substantially transparent conductive material such as Indium Tin Oxide (ITO). The lines are often arranged orthogonally on a substantially transparent substrate. An ESD event can be coupled into the matrix of drive lines and sense lines, causing signals to appear that can be misinterpreted as a touch or proximity event. Also, ESD events can be coupled into the matrix of drive and sense lines causing signals to appear as negative touches, such that when a real touch occurs, it is missed. The false touches or missed touches can lead to an overall degradation of the user experience in that the device will register touches that the user did not intend and furthermore may miss actual touches intended by a user of the device.

SUMMARY OF THE DISCLOSURE

This relates to a touch input device that can be configured with dedicated ESD sensors placed on the touch input device to detect the presence of an ESD event occurring on or in proximity to the device.

By taking advantage of known spatial and timing characteristics of an ESD event that manifest themselves on touch images acquired by a touch input device, the device is able to detect the occurrence of an ESD event and can subsequently ignore any touch data collected during the occurrence of the ESD event.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to the use of touch images generated by a touch sensor panel to detect the presence of an ESD event. By taking advantage of unique signal characteristics associated with ESD events, and by taking advantage of the unique touch images that are generated due to those characteristics, a touch sensitive device may be able to discern than an ESD event has occurred and can choose to ignore any touch data received during the ESD event.

Although examples disclosed herein may be described and illustrated herein in terms of mutual capacitance touch sensor panels, it should be understood that the examples are not so limited, but are additionally applicable to self-capacitance sensor panels, and both single and multi-touch sensor panels in which the fabrication of conductive traces is required.

Figure 1:
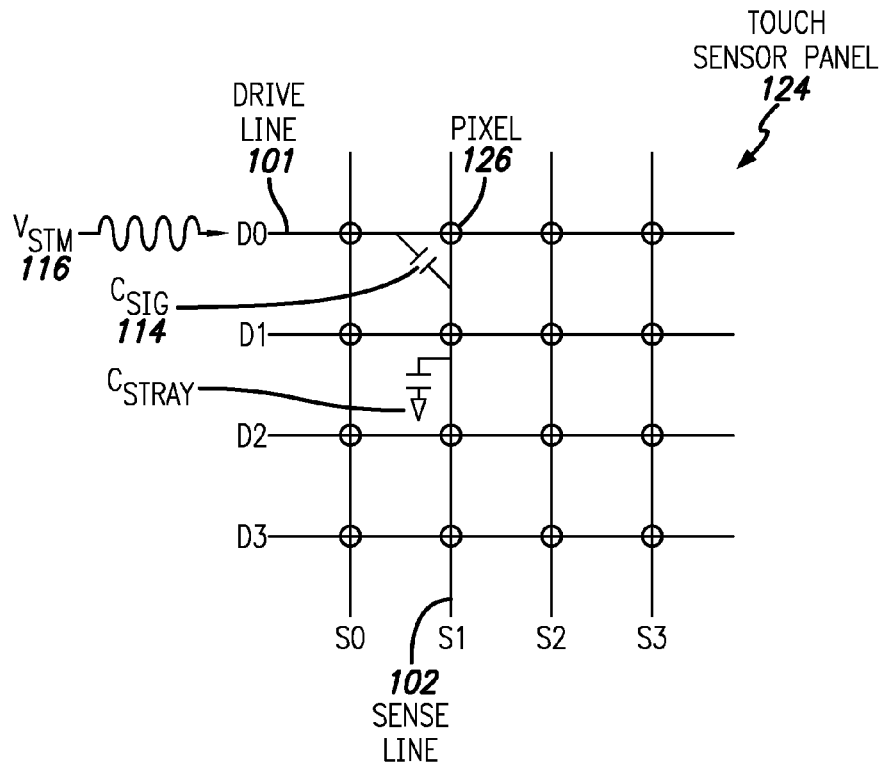
FIG. 1 illustrates an exemplary touch sensor panel in a no-touch condition according to disclosed examples.

FIG. 1 illustrates an exemplary touch sensor panel in a no-touch condition, i.e., when there are presently no touches at the panel, according to various examples. In the example of FIG. 1, touch sensor panel 124 can include an array of pixels 126 that can be formed at the crossings of rows of drive lines 101 (D0-D3) and columns of sense lines 102 (S0-S3). Each pixel 126 can have an associated mutual capacitance Csig 114 when the drive line 101 forming the pixel is stimulated with a stimulation signal Vstm 116. Each pixel 126 can also have an associated stray capacitance Cstray when the drive line 101 forming the pixel is not stimulated with a stimulation signal Vstm 116 but is connected to DC. In this example, drive line D0 can be stimulated with stimulation signal 116 (Vstm), forming mutual capacitance Csig 114 at the pixels 126 formed between the drive line D0 and the crossing sense lines S0-S3. One or more drive lines 101 can be stimulated at a time.

Figure 2:
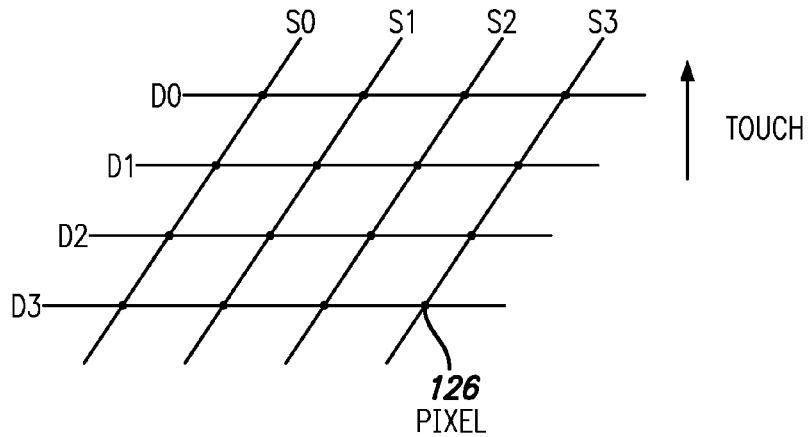
FIG. 2 illustrates an exemplary touch image map in a no-touch condition according to disclosed examples.

FIG. 2 illustrates an exemplary touch map of a touch sensor panel in a no-touch condition according to various examples, wherein touches detected in increasing amounts would symbolically register in the z-direction as shown by the arrow indicating increasing touch data values. In the example of FIG. 2, drive lines D0-D3 of a touch sensor panel can be individually and/or simultaneously stimulated with stimulation signal(s) Vstm. Since there are no fingers (or other objects) touching the pixels 126 formed by the drive lines D0-D3 and the crossing sense lines S0-S3, there is nothing to block some of the electric field lines formed when the drive lines are stimulated so as to reduce the mutual capacitance Csig by an amount ΔCsig. As such, the touch map can remain substantially flat at the pixels 126 to indicate no touch.

Referring again to FIG. 1, when a grounded user's finger (or other object) touches the panel 124, the finger can cause the capacitance Csig 114 to reduce by an amount ΔCsig at the touch location as previously mentioned. This capacitance change ΔCsig can be caused by current or charge from the electric field lines being shunted through the touching finger to ground. Touch signals representative of the capacitance change ΔCsig can be transmitted by the sense lines 102 to the sense circuitry for processing. The touch signals can indicate the pixel 126 where the touch occurred and the amount of touch that occurred at that pixel location.

Figure 3:
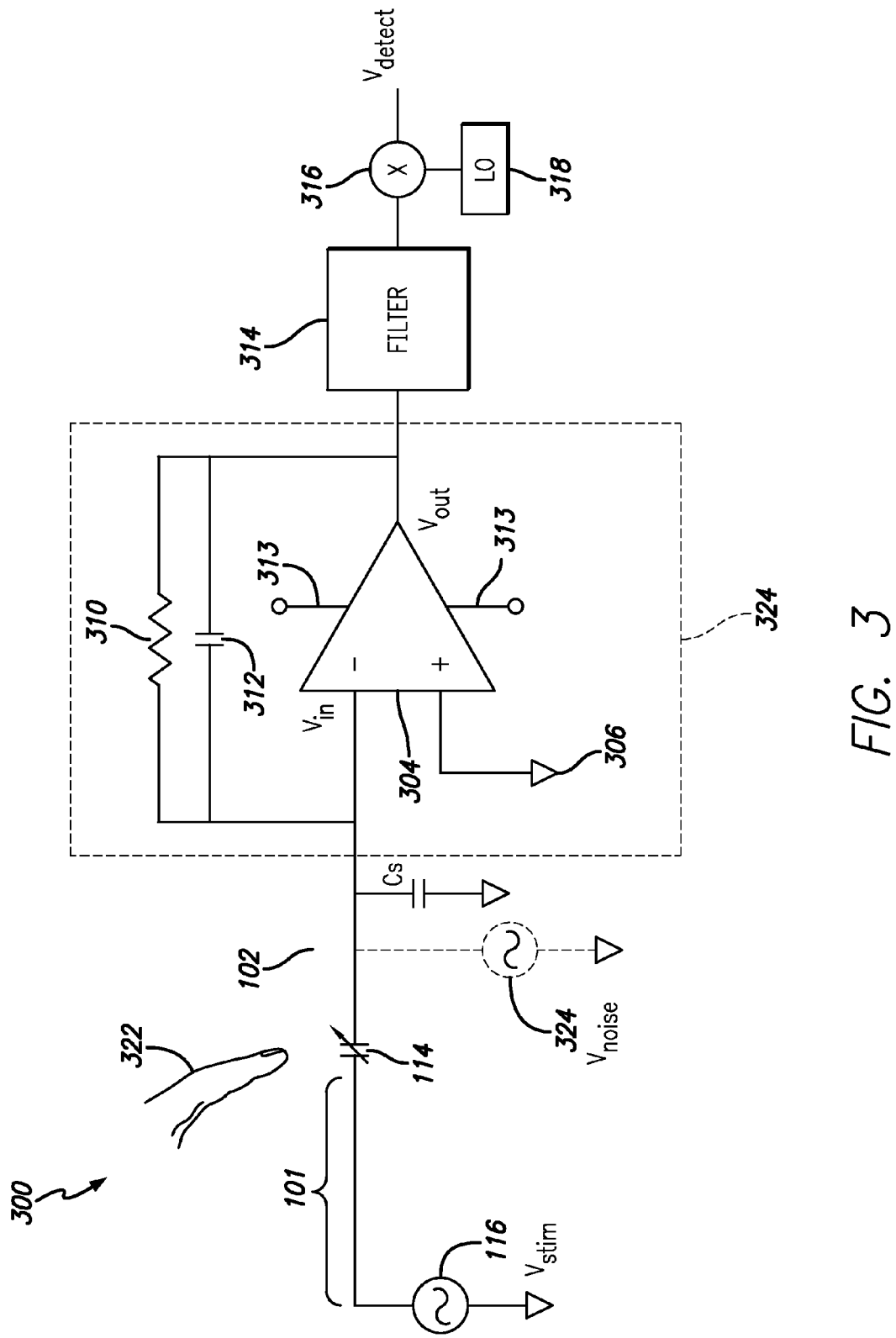
FIG. 3 illustrates an exemplary sensing circuit of a touch sensor panel according to disclosed examples.

FIG. 3 illustrates an exemplary sensing circuit of a touch sensor panel according to disclosed examples. Drive line 101 can be stimulated by stimulation signal 116. Stimulation signal 116 can be capacitively coupled to sense line 102 through the mutual capacitance 114 between drive line 101 and the sense line. When a finger or object 322 approaches the touch node created by the intersection of drive line 101 and sense line 102, the mutual capacitance 114 can be altered. This change in mutual capacitance 114 can be detected to indicate a touch or proximity event. The sense signal coupled onto sense line 102 can then be received by sense amplifier 324. Sense amplifier 324 can include operational amplifier 304, and at least one of a feedback resistor 310 and a feedback capacitor 312. FIG. 3 is shown for the general case in which both resistive and capacitive feedback elements are utilized. The sense signal can be inputted into the inverting input (referred to as Vin) of the operational amplifier 304, and the non-inverting input can be tied to a reference voltage Vref 306. The operational amplifier 304 can adjust its output voltage to keep Vin approximately equivalent to Vref and therefore keep Vin constant or virtually grounded as to reject stray capacitance Cs or any change thereof. Therefore, the gain of the amplifier can be mostly a function of the ratio of the signal capacitance 114 and the feedback impedance, comprised of resistors 310 and capacitor 312. The output of sense amplifier 304 Vout can be further filtered and heterodyned or homodyned by being fed into a multiplier 316, and multiplied with a local oscillator 318 to produce Vdetect. One skilled in the art will recognize that the placement of filter 314 can be varied, and thus could be placed after multiplier 316, or two filters can be employed, one before the mixer and one after the mixer. In some examples, there can be no filter at all. The direct current (DC) portion of Vdetect can be used to detect if a touch or proximity event has occurred.

An ESD event occurring on the touch sensor panel and being coupled into the sense signal pathway can be modeled by noise source 324 (Vnoise). During an ESD event, Vnoise 324 can inject a signal onto the sense line 102. This injection can compromise the sense circuit's 300 ability to reliably detect the change in mutual capacitance 114. An ESD event can inject a signal that is both positive in amplitude as well as negative and thus can cause the sense circuit 300 to register either a touch event when no touch event exists, or can cause no touch to be registered when a touch does exist. Furthermore, while not illustrated, an ESD event can also be coupled into the signal pathway via the drive line side of the sense circuit.

Figure 4A:
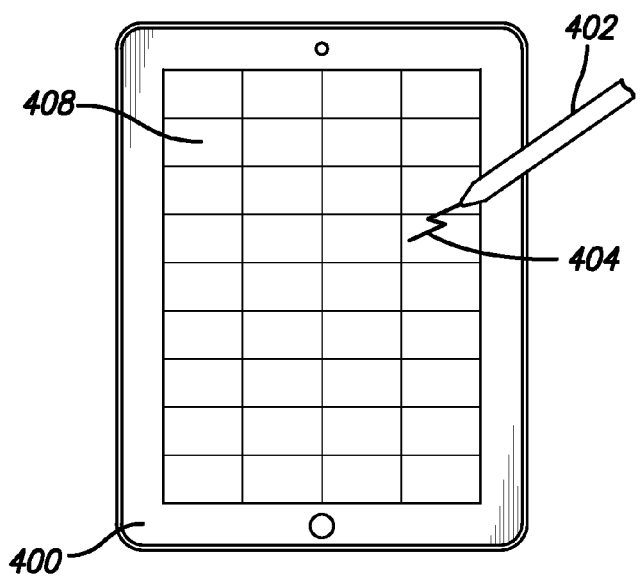
FIG. 4a illustrates an exemplary device incorporating a touch sensor panel with an ESD event occurring on the touch sensor panel according to disclosed examples.

FIG. 4a illustrates an exemplary device incorporating a touch sensor panel with an ESD event occurring on the touch sensor panel according to disclosed examples. As illustrated, a device 400 that contains a touch sensor panel 408 can have an ESD pulse 404 imparted directly on the touch sensor by an object 402. The ESD pulse 404 can be coupled onto the sense circuitry of the touch sensor panel as described above.

Figure 4B:
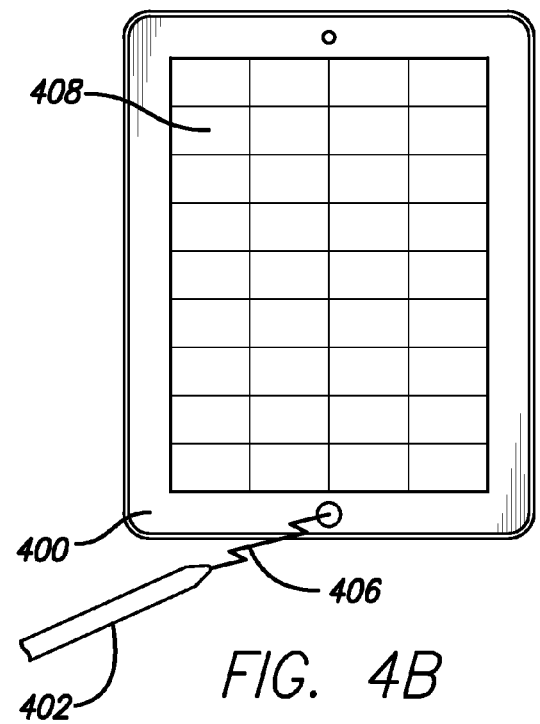
FIG. 4b illustrates an exemplary device incorporating a touch sensor panel with an ESD event occurring proximal to the touch sensor panel according to disclosed examples.

FIG. 4b illustrates an exemplary device incorporating a touch sensor panel with an ESD event occurring proximal to the touch sensor panel according to disclosed examples. As illustrated, device 400 containing touch sensor panel 408 can have an ESD pulse 406 that is imparted proximal to but not directly onto a touch sensor panel 408. While the ESD pulse 406 may be directed towards circuitry that is not part of the sensing circuitry described in FIG. 3, the electrical layout of device 400 may provide coupling pathways onto the sensing circuitry that can be modeled by the circuit diagram illustrated in FIG. 3.

The location of an ESD event can in some instances create a signal that can be distinguished from an expected touch signal due to the difference in magnitude of an ESD pulse and a touch signal. Thus an ESD event can be detected merely by noting the intensity of the signal received by the sense circuitry.

Figure 5A:
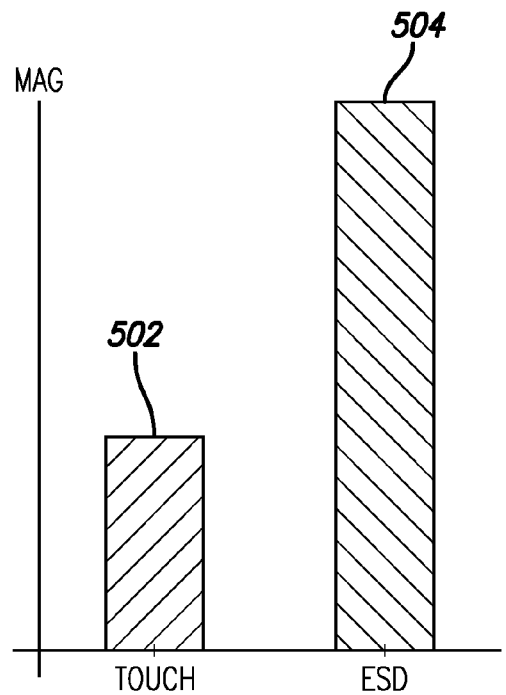
FIG. 5a illustrates an exemplary comparison between the magnitude of a touch signal and the magnitude of an ESD event according to disclosed examples.

FIG. 5a illustrates an exemplary comparison between the magnitude of a touch signal and the magnitude of an ESD event according to disclosed examples. As illustrated, the magnitude of a touch signal depicted by bar 502 can be smaller than the magnitude of an ESD event depicted by bar 504. In this example, since an ESD event is larger in magnitude than a touch signal, the device can distinguish between ESD events and touch events simply by noting the magnitude of the signal outputted by the touch sensing circuitry. If a detected signal exceeds a pre-determined threshold, then the device can determine that the signal was caused by an ESD event.

Figure 5B:
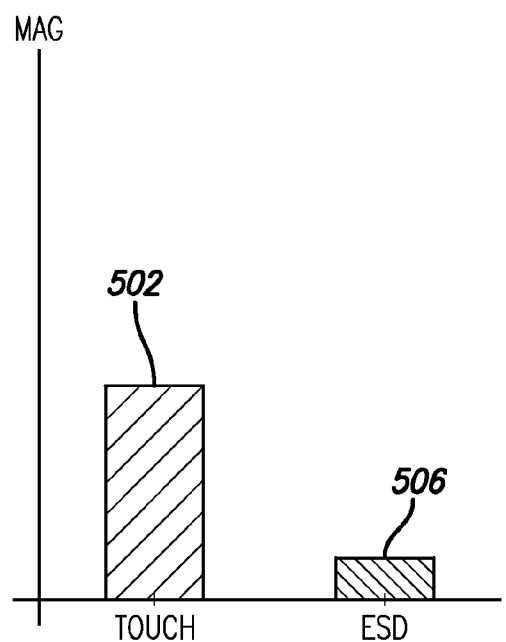
FIG. 5b illustrates another exemplary comparison between the magnitude of a touch signal and the magnitude of an ESD event according to disclosed examples.

FIG. 5b illustrates another exemplary comparison between the magnitude of a touch signal and the magnitude of an ESD event according to disclosed examples. In this example, the magnitude of the ESD signal depicted by bar 506 is smaller than the magnitude of a touch signal. In this example, since an ESD event is smaller in magnitude than a touch signal, the device can distinguish between ESD events and touch events simply by noting the magnitude of the signal outputted by the touch sensing circuitry. If a detected signal falls below a pre-determined threshold, then the device can determine that the signal was caused by an ESD event.

In some examples, the configuration of a touch sensitive device can be altered in order to increase the difference in magnitude between a touch signal and an ESD signal. For example in order to make the magnitude of an ESD event smaller, capacitive shielding can be applied to the device so that less energy from an ESD event can be coupled into the sensing circuitry. In another example, if a higher magnitude of an ESD signal is desired so that it can be distinguished from a touch signal, the device can increase the capacitive coupling of an ESD event onto the sense circuitry by, for instance, removing grounding guards on the device, making a cover glass on the device thinner, or by widening the gap between drive lines and sense lines at areas that are vulnerable to ESD events.

However, despite the measures above, in some instances a touch signal cannot be distinguished from an ESD event based on magnitude, and thus another characteristic of an ESD signal can be used to distinguish the ESD event from an actual touch signal. For instance, ESD events can be coupled into the sense signal pathway via specific features of the touch sensor panel. For instance an ESD event can be coupled into the sense signal pathway via a bondpad that is applied to various locations in the touch sensor panel to bond the individual layers of a touch sensor panel together. The bondpads can be configured in a distinct pattern such that the touch sensitive device can discern a touch from an ESD event.

Figure 6A:
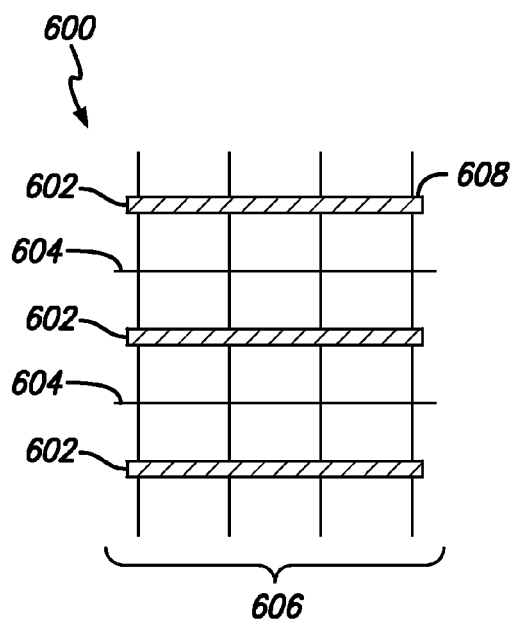
FIG. 6a illustrates an exemplary set of drive lines and sense lines that have a bonding layer selectively applied to them according to disclosed examples.

FIG. 6a illustrates an exemplary set of drive lines and sense lines that have a bondpad arrangement according to disclosed examples. In this example, the bondpads 608 can be arranged so that they correspond to every other drive line such that there exists one set of drive lines 602 that have bondpads, and another set of drive lines 604 that do not have bondpads. Each set of drive lines 602 and 604 can correspond to one set of sense lines 606.

Figure 6B:
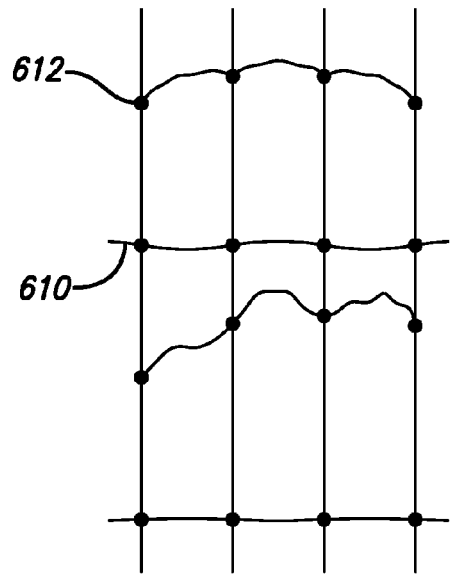
FIG. 6b illustrates an exemplary touch image according to disclosed examples.

FIG. 6b illustrates an exemplary touch map during an ESD event according to disclosed examples. As illustrated, the portions of the touch map corresponding to drive lines 602 that have bondpads can register a signal 612 that looks like a touch signal in response to an ESD event since the ESD event can be coupled to the sense circuitry via drive lines that have bondpads associated with them. As illustrated in FIG. 6b, the portions 610 of the touch map that correspond to drive lines 604 that do not have bond pads may not register a signal since the energy from an ESD event is not coupled into those particular drive lines. Since the bondpads are arranged such that they correspond to every other row, a touch image caused by an ESD event can form a distinct pattern in which every other drive line can register a signal and the remaining drive lines can register no signal or a minimal signal. Since a signal registered by a user's touch or by an object is usually continuous (a user's finger is not likely to stimulate every other drive line), if a signal is registered by a device that has every other drive line stimulated, the device can identify the signal as an ESD event.

In some examples, the time characteristics of an ESD event can be used to distinguish a touch input from an ESD event. For instance, the quick speed (<200 µs) at which an ESD event appears and then disappears from a touch sensor panel can be used to distinguish an ESD event from a touch input. For example, the timing characteristics of an ESD event can be used by a multi-stimulation (multi-stim) touch sensor panel to selectively disregard certain touch data.

Figure 7:
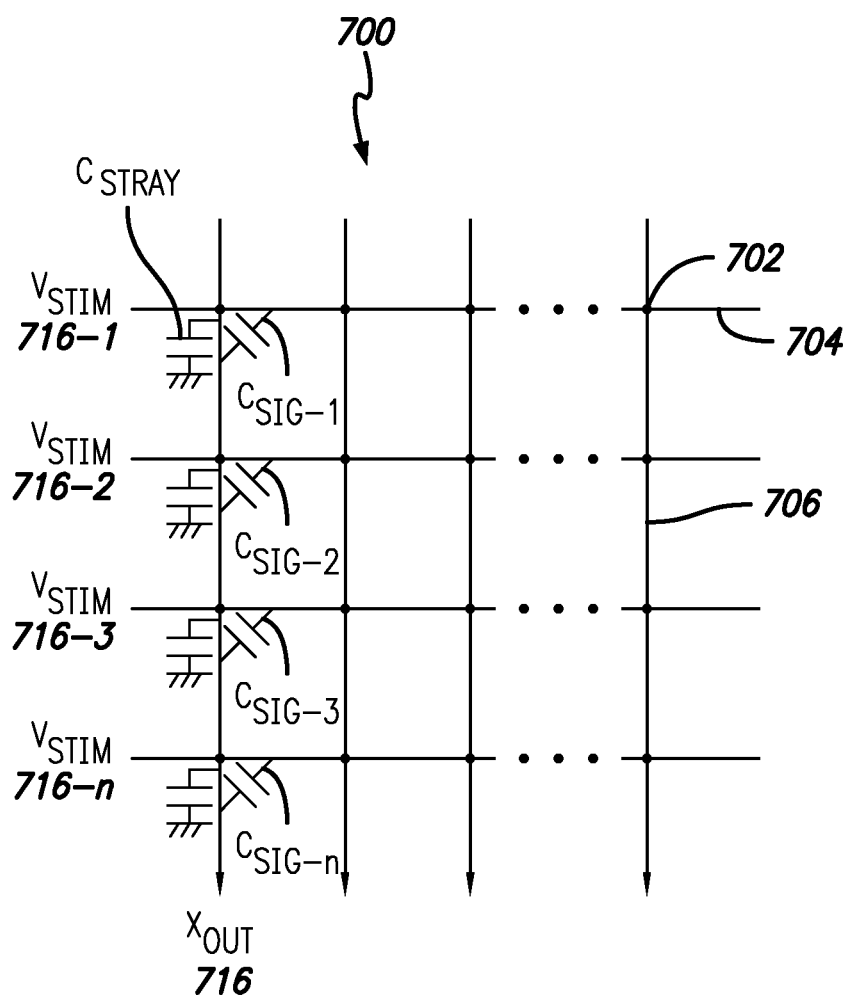
FIG. 7 illustrates an exemplary multi-stimulation touch sensor panel according to disclosed examples.

FIG. 7 illustrates an exemplary multi-stimulation touch sensor panel according to disclosed examples. In the example of FIG. 7, the panel 700 can include a plurality of drive lines 704 and a plurality of sense lines 706. An intersection of a drive line 704 and a sense line 706 can define a node 702. FIG. 7 indicates the presence of a stray capacitance Cstray and a mutual capacitance Csig at each node 702 located at the intersection of a drive line 704 and a sense line 706 (although Cstray and Csig for only one column are illustrated in FIG. 7 for purposes of simplifying the figure). Stimulation signals Vstim 716-1 through 716-$n$ can be simultaneously applied to the n drive lines 704, where n can be any integer. Each stimulation signal Vstim 716 can be at a different phase, as will be explained later, and upon being applied to a drive line, can cause a charge Qsig=Csig*Vstim to be injected into the sense lines through the mutual capacitance Csig present at the affected nodes. A change in the injected charge can be detected when a finger, palm or other object is present at one or more of the affected nodes. The stimulation signals 716 can be sine waves or any other suitable waveform or combination of waveforms at a suitable frequency or phase, or a combination of frequencies and/or phases for stimulating the drive lines 704. Note that although FIG. 7 illustrates drive lines 704 and sense lines 206 as being substantially perpendicular, they need not be so aligned. As described above, each sense line 706 can be connected to a sense channel (see FIG. 3).

An example voltage of Vstim 716 can be about 4.16V. An example phase of Vstim 716 can be either 0° or 180°, which can be determined according to examples of the disclosure. A sense channel (see FIG. 3) having a charge amplifier, including feedback capacitor Cfb and feedback resistor Rfb, can receive the charge generated by the applied stimulation signal Vstim 716 and the signal capacitance Csig. The stray capacitance Cstray can be rendered ineffective at the charge amplifier using the virtual grounding provided by the feedback around the amplifier. An exemplary sense channel is disclosed in U.S. application Ser. No. 11/649,998, filed Jan. 3, 2007, the contents of which are incorporated by reference herein in their entirety for all purposes.

All or most of the drive lines 704 can be simultaneously stimulated ("multi-stim") according to examples of the disclosure. In multi-stim, charges Qsig can be generated by Vstim 716 and Csig for all of the drive lines. The total charge output Xout 716 may be the sum of all charge injected into the sense line by each stimulated drive line. The output may be the superposition of all stimulation signals Vstim 716 multiplied by each of the Csig values on the sense line. In one example, sense line 706 can have some pixels 702 which are driven by stimulation signals 716 having a phase of 0° and simultaneously have other pixels 702 which are driven by stimulation signals 716 having a phase of 180°, although other phases are possible.

While the stimulation signals drive the drive lines, the signal capacitance for each pixel may have a certain value Csig. When a touch or hover event occurs, Csig for the affected pixels may reduce by an amount ΔCsig. This reduction may be detected in the panel output signal, thereby detecting the event.

Referring again to FIG. 7, signal capacitances Csig-1 through Csig-n can be formed at the pixels 702 when stimulation signals Vstim 716-1 through 716-$n$ are applied to the n drive lines 704. Charges Qsig (not shown in FIG. 7) can be generated by the stimulation signals Vstim 716 and the signal capacitances Csig, and injected onto one or more sense lines 706. FIG. 7 shows the signal capacitances Csig-1 through Csig-n for only one sense line. However, the signal capacitances for the other sense lines intersecting the same drive line may be roughly the same. For example, all the sense lines that intersect the first drive line may have signal capacitance of about Csig-1 at the corresponding pixels; all the sense lines that intersect the second drive line may have signal capacitance of about Csig-2 at the corresponding pixels; and so on. Therefore, only one sense line need be considered here.

Each charge Qsig can be calculated as follows.

$$Q\text{sig} = V\text{stim} * C\text{sig} \tag{1}$$

where Vstim is the stimulation signal applied to a drive line and Csig is the signal capacitance formed at the pixel defined by the intersection of that drive line with a sense line. The output Xout 716 is the sum of the charges Qsig generated by the stimulation signals and the signal capacitances at all the pixels on a particular sense line and can be calculated as follows.

$$Xout = \sum_{i=1}^{n} Qsig(i) \tag{2}$$

$$Xout = \sum_{i=1}^{n} Vstim(i) * Csig(i) \tag{3}$$

where i is a summation index for drive lines 1 to n. Here, the stimulation signals Vstim and the output Xout can be measured and are therefore known. The n values of Csig are not. However, the n unknown Csig values can be determined, e.g., using linear algebra concepts. In order to determine the n unknown Csig values, n equations may be needed to show the relationship between Vstim, Xout, and Csig (see, e.g., Equation (3)). These n equations could be formulated by performing a series of n steps where, during each step, a different set of stimulation signals Vstim could be simultaneously applied to the drive lines of the panel, thereby generating Csigs, and the resulting output Xout from a sense line of the panel could be measured.

Matrices can be a convenient way to represent these n equations as follows:

$$\begin{bmatrix} X1 \\ X2 \\ X3 \\ \ldots \\ Xn \end{bmatrix} = \begin{bmatrix} V11 & V12 & V13 & \ldots & V1n \\ V21 & V22 & V23 & \ldots & V2n \\ V31 & V32 & V33 & \ldots & V3n \\ \ldots & \ldots & \ldots & \ldots & \ldots \\ Vn1 & Vn2 & Vn3 & \ldots & Vnn \end{bmatrix} \times \begin{bmatrix} C1 \\ C2 \\ C3 \\ \ldots \\ Cn \end{bmatrix} \tag{4}$$

where the X matrix has elements X1 through Xn which represent Xout measured from a particular sense line in steps 1 through n; the V matrix has elements V11 through Vnn which represent Vstim applied to the drive lines in steps 1 through n, where each row represents the n stimulation signals simultaneously applied to the n drive lines during a particular step, each column represents a drive line to be stimulated, and each element represents a stimulation voltage; and the C matrix has elements C1 through Cn which represent Csig formed at the pixels defined by the intersection of drive lines 1 through n and the particular sense line. In the case where Vstim can either be a signal with a phase of 0° or 180°, the elements of the V matrix can be represented by a 1 and −1, with 1 corresponding to a signal with a 0° phase, and −1 corresponding to a signal with a 180° phase. For the purposes of illustration and simplification, as an example if one assumes that there are only four drive lines and one sense line, thus giving way to four nodes, equation (5) can be simplified to be:

$$\begin{bmatrix} X1 \\ X2 \\ X3 \\ X4 \end{bmatrix} = \begin{bmatrix} V11 & V12 & V13 & V14 \\ V21 & V22 & V23 & V24 \\ V31 & V32 & V33 & V34 \\ V41 & V42 & V43 & V44 \end{bmatrix} \times \begin{bmatrix} C1 \\ C2 \\ C3 \\ C4 \end{bmatrix} \tag{5}$$

Thus, for instance, the output of the sense line during the first step of the multi stim procedure can be represented by X1. X1 can be represented as:

$$X1 = V11 \times C1 + V12 \times C2 + V13 \times C3 + V14 \times C4 \tag{6}$$

The multi-stim procedure can assume that C1-C4 stays constant during the entire multi-stim scan. When there is no touch, the values of C1-C4 can be zero or close to zero. ESD events, however, can appear and then disappear quickly relative to a touch signal (for instance <200 μs) and thus may only be present during one scan step of a multi-stim scan.

Figure 8:
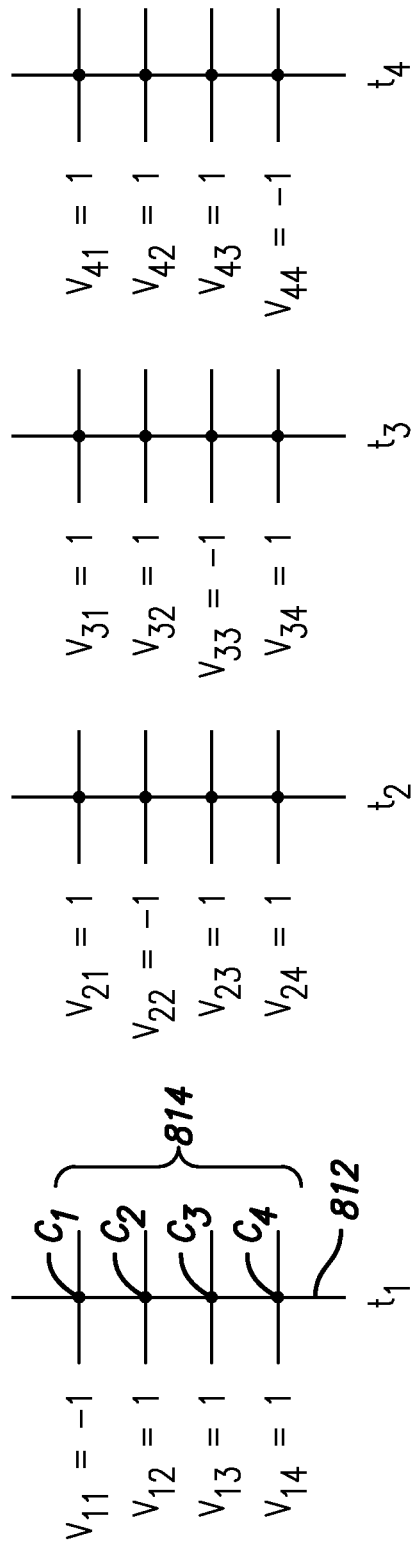
FIG. 8 illustrates an exemplary set of stimulation steps at various moments in time for a multi-stim touch sensor panel according to disclosed examples.

FIG. 8 illustrates an exemplary series of steps in a multi-stim scheme to generate a touch image. In the example of FIG. 8, four drive lines 814 intersect one sense line 812. At t1, which corresponds to the first step of the multi-stim procedure, the values of V11, V12, V13 and V14 can be set to −1, 1, 1, 1 respectively. At t2, which corresponds to the second step of the multi-stim procedure, the values of V21, V22, V23, V24 can be set to 1, −1, 1, and 1 respectively. At t3, which corresponds to the third step of the multi-stim procedure, the values of V31, V32, V33, and V34 can be set to 1, 1, −1, and 1 respectively. Finally, at t4, which corresponds to the fourth step of the multi-stim procedure, the values of V41, V42, V43 and V44 can be set to 1, 1, 1, and −1 respectively. With the multi-stim procedure described above, equation (5) becomes:

$$\begin{bmatrix} X1 \\ X2 \\ X3 \\ X4 \end{bmatrix} = \begin{bmatrix} -1 & 1 & 1 & 1 \\ 1 & -1 & 1 & 1 \\ 1 & 1 & -1 & 1 \\ 1 & 1 & 1 & -1 \end{bmatrix} \times \begin{bmatrix} C1 \\ C2 \\ C3 \\ C4 \end{bmatrix} \tag{7}$$

Each row of the Vstim matrix can be labeled as a basis vector for the multi-stim procedure. Thus equation (7) above contains four basis vectors:

[−1 1 1 1]

[1 −1 1 1]

[1 1 −1 1]

[1 1 1 −1]

When no touch is occurring on the panel, the values of C1-C4 can be zero or close to zero, which means that the values of X1-X4 will also be zero or close to zero. During a touch event, the multi-stim procedure can be completed in a speed that is quicker than the user's ability to change the touch input and thus C1-C4 can be constant throughout the entire multi-stim procedure. However, an ESD event can occur with a speed such that it only appears during one step in the multi-stim procedure. In one example using the multi-stim procedure of equation (7), if no-touch is occurring on the touch sensor panel, but an ESD event occurs during the third step of the multi-stim, then X1, X2 and X4 will be zero or close to zero while X3 can equal:

$$X3 = [1\ 1\ -1\ 1] \times \begin{bmatrix} C1 \\ C2 \\ C3 \\ C4 \end{bmatrix} \qquad (8)$$

where C1-C4 represents the effect of an ESD event on a touch sensor panel. A touch sensor panel using multi-stim can detect when a signal appears only during some of the steps in the multi-stim procedure to determine that an ESD event occurs.

In an example where a touch signal and ESD event occur during a multi-stim cycle, C1-C4, instead of being zero or close to zero, can represent the amount of touch at each touch node. If an ESD event occurs during step 3 of the multi-stim procedure, then X3 can equal:

$$X3 = [1\ 1\ -1\ 1] \times \begin{bmatrix} C1+E \\ C2+E \\ C3+E \\ C4+E \end{bmatrix} \qquad (9)$$

E in equation (9) can represent an ESD signal appearing on the touch sensor panel. A touch sensor panel can detect the change in value of the touch signal during one step of the multi-stim procedure to determine that an ESD event has occurred.

During a normal touch operation, each basis vector can be applied to the touch input to develop a composite image of touch. However, during an ESD event, since the event can span the duration during which only one basis vector is being applied, the composite image can be strongly correlated to one basis vector. Thus, in order to determine the occurrence of an ESD event, a touch image's correlation to a basis vector can be analyzed. While the example above describes the ESD event's duration as lasting during the application of one basis vector, one skilled in the art will recognize that an ESD event can occur over a plurality of basis vectors, for example 3 basis vectors. Even in the example of 3 basis vectors, an ESD event can be distinguished from a touch event, since a touch event will present during the application of all the basis vectors in a given multi-stim procedure.

Figure 9:
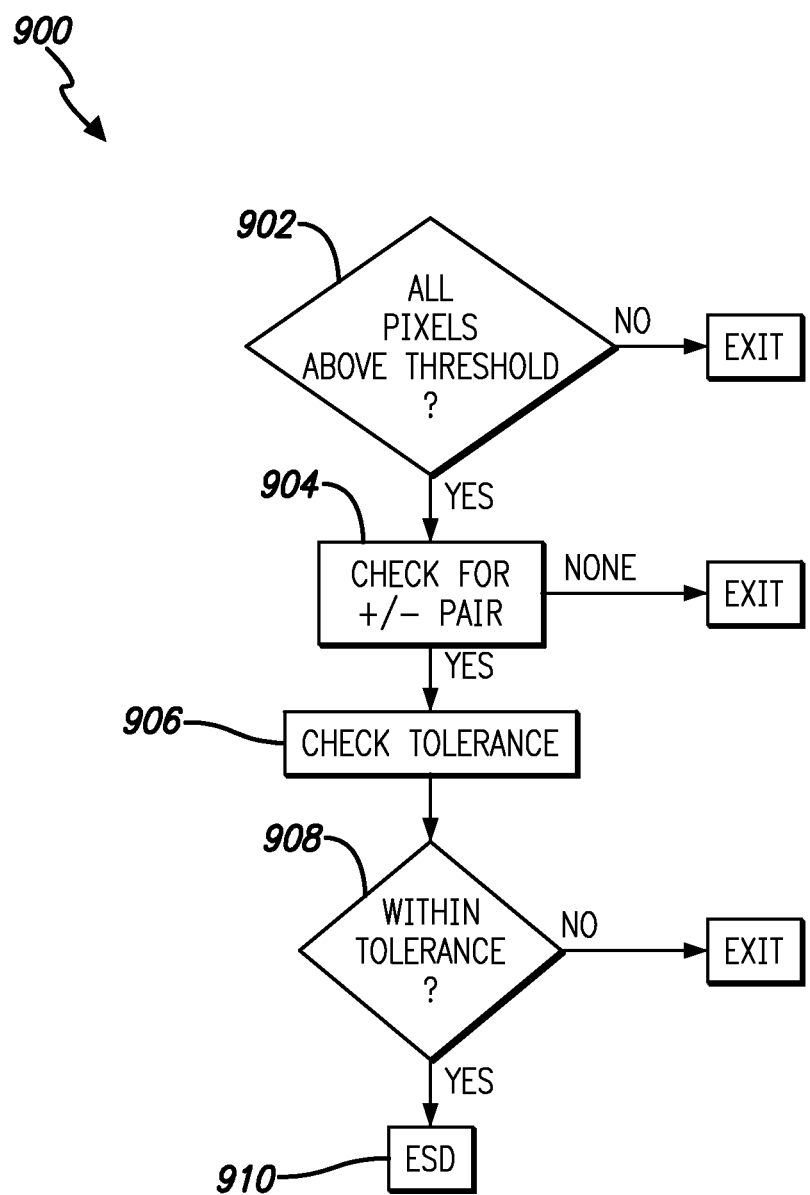
FIG. 9 illustrates an exemplary method for determining the occurrence of an ESD event on a touch sensor panel.

FIG. 9 illustrates an exemplary method for determining the occurrence of an ESD event on a touch sensor panel. Flowchart 900 begins with step 902 in which the composite touch image is scanned to ensure that all values are above a pre-determined threshold magnitude. This can be done to ensure decreasing the likelihood of false positive ESD readings.

If the magnitude of all the values in the touch image are above the pre-determined threshold magnitude then the method moves to step 904, but if not, the method can exit without detection of an ESD event. At step 904, each adjacent pixel pair in the touch image can be checked to see if an opposite sign pair pattern can be detected. For instance, using the four pixel example, adjacent pixel pairs could consist of the first pixel and the second pixel, or the second pixel and the third pixel, or the third pixel and the fourth pixel. An opposite sign pair means that the adjacent pixels have an opposite amplitude, for instance [−500, 500] or [−40, 40], etc. Checking for a an opposite sign pair pattern can be indicative of an ESD value because an ESD signal tends to be constant or relatively flat in amplitude, while in a four basis vector multi-stim procedure, each vector has only one opposite sign pair pattern. For instance, using the third basis vector as an example:

[1 1 −1 1]

pixels 2 and 3 and pixels 3 and 4 have an opposite sign pair pattern. In the first basis vector, the opposite sign pair would be on pixel 1 and 2, etc. If an ESD event occurs during the third step of the multi-stim procedure and, for example, the ESD event has an amplitude of +500, then the composite touch image using equation (5) becomes:

$$\begin{bmatrix} 500 \\ 500 \\ -500 \\ 500 \end{bmatrix} \qquad (10)$$

If no opposite sign pair is established, the method can be exited without detection of an ESD event. If an opposite sign pair is detected, then the method can move to step 906 in which the opposite sign pair can be analyzed to see if it is within a pre-determined tolerance. The purpose of checking tolerances is to distinguish an opposite sign pair from ungrounded objects that can generate negative pixel patterns. Since ESD signals can be relatively flat, the opposite sign pair should be close to being equidistant from zero. In one example, a tolerance can be calculated using the following equation:

||pixel 1|−|pixel 2||/max{|pixel1|,|pixel 2|}<pre-determined tolerance %

For example, if the pre-determined tolerance is equal to 4%, using the result listed in equation (10) the tolerance check would yield the following:

||500|−|−500||/max{|500|,|−500|}=0/500<4%

Thus, the above example would be within tolerance and could then move to step 910 indicating that an ESD event has occurred. In another example, suppose the result obtained during the scan was [500 500 −90 500]; using this result and testing the tolerance would yield:

||500|−|−90||/max{|500|,|−90|}=410/500=82%

Since 82% is greater than the pre-determined tolerance limit of 4%, the result would be deemed out of tolerance and the method can exit without detection of an ESD event.

In some examples, the method described above can be combined with a method that takes advantage of the spatial characteristics of an ESD event in order to decrease the likelihood of a false ESD event detection. If for instance, if it can be empirically determined that an ESD signal when asserted occupies a space of four touch nodes, for example, then a touch sensor panel can use that empirically determined characteristic to perform a scan of the touch sensor panel to detect an ESD event.

Figure 10:
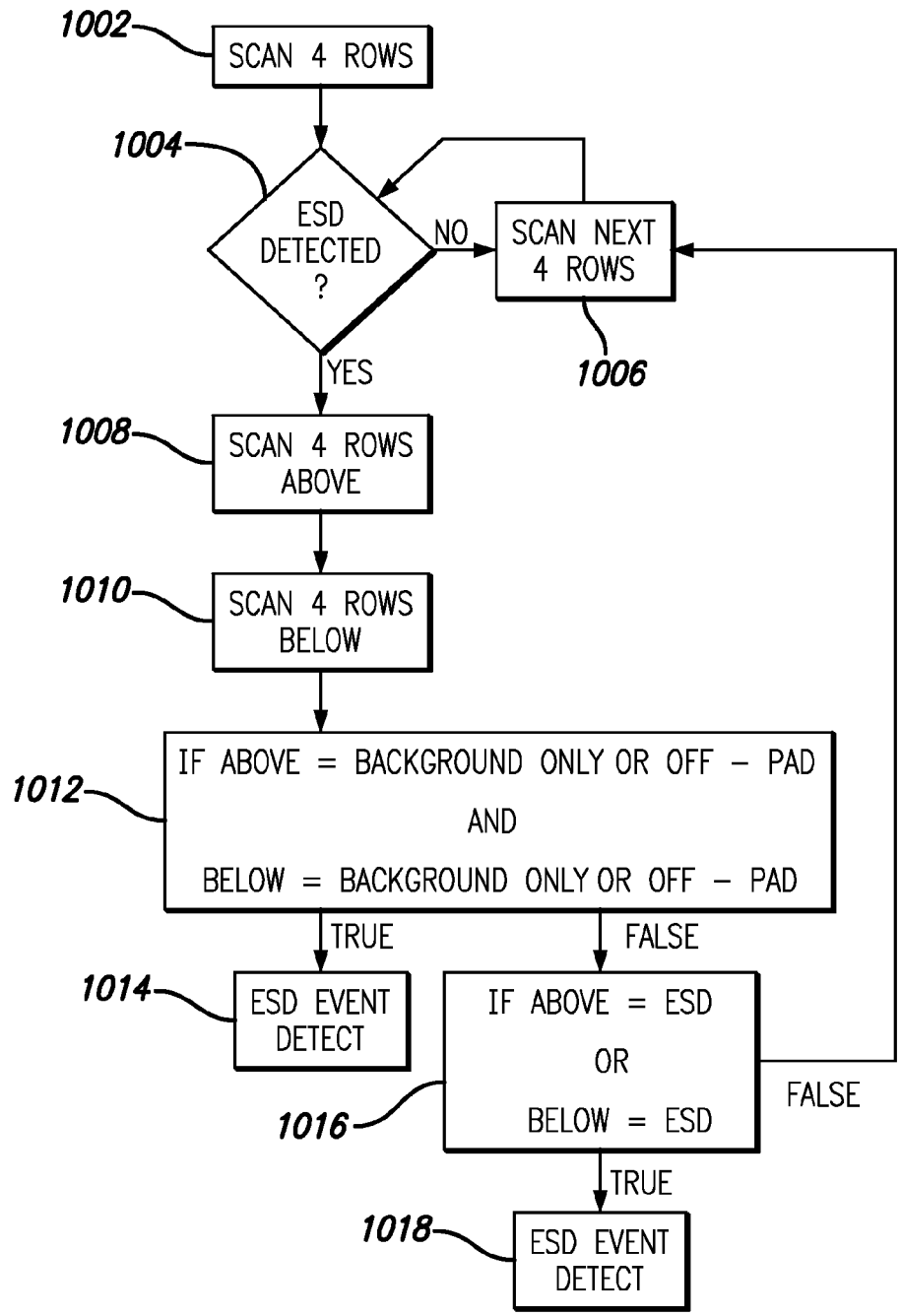
FIG. 10 illustrates an exemplary ESD scan procedure according to some disclosed examples.

FIG. 10 illustrates an exemplary ESD scan procedure according to some disclosed examples. While this example assumes that an ESD will occupy four touch nodes, the disclosure is not so limited and can be modified to include ESD events that occupy more or less nodes. At step 1002, four rows corresponding to one sense line can be scanned for ESD using the methods described above in the discussion pertaining to FIG. 7 and FIG. 8, or any other method for detecting an ESD event discussed herein. At step 1004, if an ESD event is detected, in order to check for false positives, the procedure can then move to steps 1008 and 1010. If no event is detected, then the procedure can move to step 1006 and another four rows can be scanned. At step 1008, the four rows immediately above the four rows in which an ESD event was detected can be scanned using the procedure outlined in FIGS. 7 and 8. Also at step 1010, the four rows immediately below the four rows in which an ESD event was detected can be scanned using the procedure outlined in FIGS. 7 and 8. At step 1012, if the rows immediately above are found to not have an ESD event, in other words only background noise is detected (only contains values below a preset noise floor), or if there are no rows above (i.e. the rows above are off the touch sensor panel), and if the rows immediately below are found to not have an ESD event or if there are no rows below (i.e. the rows below are off the touch sensor panel), the procedure can move to step 1014. In step 1014, the touch sensor panel can determine that an ESD event has occurred since the ESD event is confined only to the original four rows being scanned, which is what would be expected based on the spatial characteristics of an ESD event. If the outcome of step 1012 is false, then the procedure can move to step 1016. At step 1016, if either the rows above register an ESD event, or the rows below register an ESD event, then an ESD event can be detected. If not, then the procedure can move back to step 1006, or in other examples can terminate.

While the method above can pertain to touch sensor panels that utilize a four element basis vector to perform a multi-stim procedure, the characteristics of basis vectors of a multi-stim procedure using a different number of elements in the basis vectors can be used to detect an ESD event. For instance if a touch sensitive device utilizes a 20 step multi-stim procedure such that a basis vector contains 20 elements, then a distinguishing characteristic of an individual basis vector can be used. For instance, if it is known that the basis vectors contain an equal number of 0° and 180° Vstim signal, then an example basis vector can be:

[1 −1 −1 1 −1 −1 −1 −1 1 1 1 1 1 −1 −1 1 1 1 −1 −1]

Using equation (4) and assuming that there is no signal during the other steps in a multi-stim procedure, and that the signal amplitude of the ESD event is 500, then the detected touch image along a column can alternate between 500 and −500, with both values appearing in the detected touch image an equal number of times. Using the fact that a basis vector in a 20 element multi-stim procedure can produce a touch image during an ESD event that has equal negative and positive values, one can detect the occurrence of an ESD event.

Figure 11:
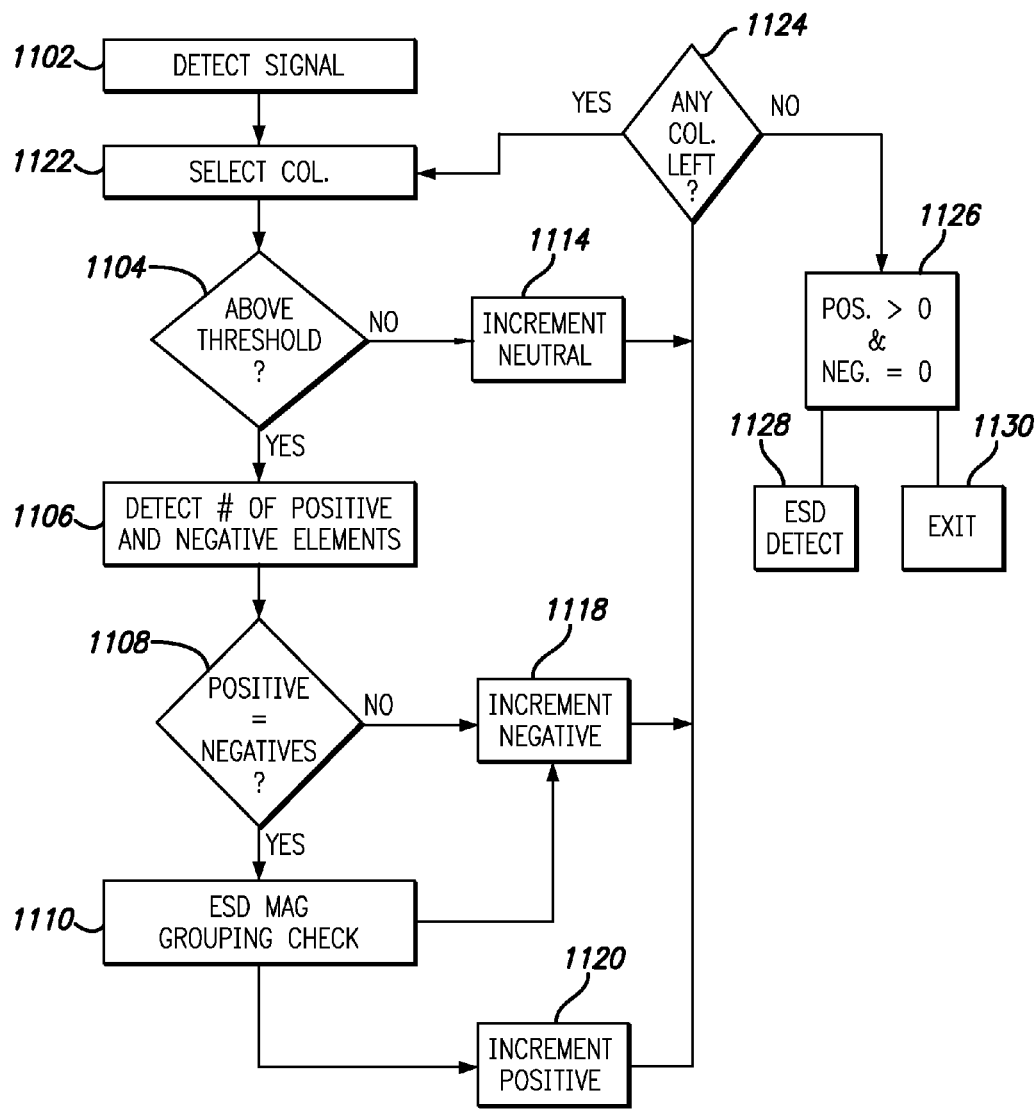
FIG. 11 illustrates an exemplary method to detect an ESD event using a basis vector of a multi-stim procedure according to some disclosed examples.

FIG. 11 illustrates an exemplary method to detect an ESD event using a basis vector of a mult-stim procedure. At step 1102, a touch image of the panel is created by using the capacitive signals detected by the touch sensor panel. The detected touch image can be scanned to determine if a signal exists on the touch image being scanned. At step 1122, one column of the touch image is selected. The selected column is then scanned to detect if a signal exists on the column. In one example, a signal along a column can be detected using the formula:

$$Ab\_sum_j / \text{\# of rows} > \text{pre-determined value} \tag{11}$$

$$\text{Where } Absum_j = \sum_{i=1}^{n} |Qsig_{ij}| \tag{12}$$

In the formula above, Qsig(ij) can represent the received signal at a row i and a column j. When the absolute value of each signal appearing on a node for a given column is summed over the entire column, and that value is divided by the number of rows in the column, at step 1104 if the result is above a pre-determined threshold then the device can know that a signal has been detected on the selected column, as opposed to no signal being received which would be expected if there were no touch or ESD events occurring on the panel. If no signal is detected, then the method can move to step 1114, and increment a counter that indicates how many neutral columns exist in the touch image. The pre-determined threshold can be determined based on the noise environment of the touch sensor panel. Once a signal is detected, the method can move to step 1106 where the number of positive and negative elements can be determined. As discussed above, in this example since the number of positive and negative phases in a basis vector are equal, and since ESD events tend to have a relatively constant amplitude, a detected touch image during an ESD event can appear similar to a basis vector of the multi-stim procedure in which the signal over a column can appear to have a constant magnitude with the amplitude having both positive and negative values in proportion to the number of positive and negative values of the basis vector. In this example, an ESD event occurring with an amplitude of 500 can produce a touch image that contains ten signals that are approximately 500 and ten signals that are approximately −500. At step 1106, the number of positives and negatives can be tabulated and if they are equal then method can move on, but if not then the method can move to step 1118 in which a counter that counts the number of negative columns is incremented. A negative column can mean that the detected signal on the column is unlikely to be an ESD event. Mathematically speaking, the operation performed can be described as:

$$\text{Positive count} = \sum_{i=1}^{n} Qsig(ij) > 0 \tag{13}$$

If the positive count=numbers of rows in the scan divided by two, then the positive and negative counts are equal which can mean that an ESD event has occurred. However, due to the presence of noise, in some examples a signal that would have otherwise been positive may be changed to negative due to noise; thus, in some examples the following test can be used to determine if the number of positive and negative elements in the touch image are indicative of an ESD event:

$$[\text{Number of rows}/2]-n<\text{positive count}<[\text{Number of rows}/2]+n \tag{14}$$

In the example of a column with 20 rows as above, and n=2, if the positive count is between 8 and 12 then the signal will pass the test and move on to the next step, which in some examples can mean that an ESD event is detected, while in other examples as explained below can require further testing.

Figure 12A:
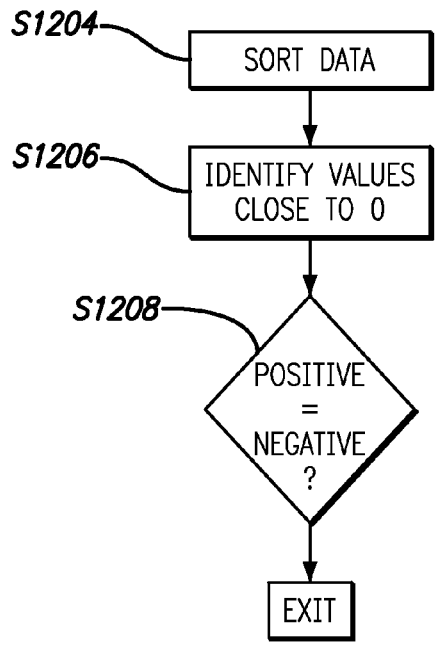
FIGS. 12a AND 12b illustrate an exemplary method to count the number of positive and negative elements in a touch image according to some disclosed examples.
Figure 12B:
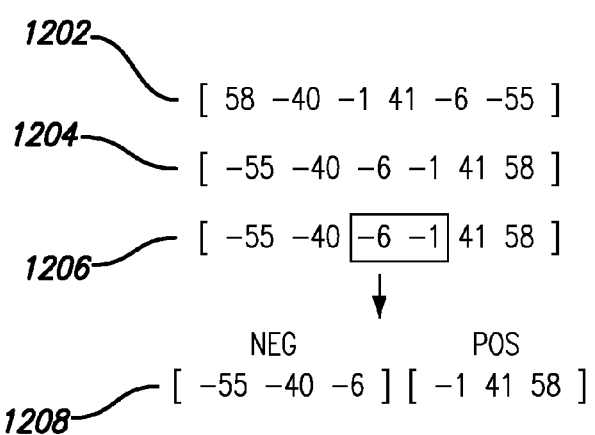

In another example, in order to combat the noise on the touch sensor panel changing measured touch image values from positive to negative (or vice versa) and thus corrupting the positive count, the method illustrated in FIG. 12a and FIG. 12b can be employed. In this example a six element touch image is used, but the method can be applicable to any touch image. The touch image at 1202 can be obtained using the method discussed above. As shown, touch image 1202 contains four negative elements and 2 positive elements, and thus would not have an equal positive and negative count. At step S1204 and shown at 1204, the data can be sorted from negative to positive. At step S1206 and shown at 1206, values that are determined to be within a pre-determined distance away from zero can be identified. Values close to zero can be especially vulnerable to noise, and thus a positive value that is close to zero can be corrupted by noise to appear as a negative value. At 1206, the elements −6 and −1 can be identified as close to zero. The algorithm can consider those values to be either a positive value or a negative value, since their distance from zero can make them vulnerable to noise that can change their sign. At S1208, the algorithm can determine if the positive values are equal to the negative values, allowing for the values that were deemed to be close to zero to act as either a positive or a negative value. Thus, at 1208 there are three negative values and three positive values since −1 can be considered as a positive value.

Returning to FIG. 11, if the number of positive elements in the column can be found to equal or substantially equal the number of negative values in the column, then the method can, in some examples, signal that an ESD event has occurred. In other examples, the method can move to step 1110 to perform an ESD magnitude grouping check. An ESD grouping magnitude check can be performed to ensure that an actual touch event occurring on the touch panel is not mistaken for an ESD event, due to the fact that the touch produced a touch image that has an equal number of positive and negative elements. Generally, a touch signal will have signal amplitudes across a column that vary in intensity. This can be contrasted with ESD signals that produce relatively flat amplitude responses. An ESD magnitude grouping check can be performed to ensure a uniformity in magnitude that can be indicative of an ESD event, and thus can be distinguished from a touch event. In some examples, a subset of adjacent elements within a touch image that has been sorted above can be selected. The subset can be analyzed to determine if the minimum and maximum within the subset are within a pre-determined threshold distance of each other. If the subset was generated in response to an ESD event, then the subset can have a relatively uniform magnitude and thus the distance between the minimum and the maximum should be below the pre-determined threshold. All of the elements within the touch image can be grouped into subsets of varying sizes and the check above can be applied. If the ESD magnitude check determines that the magnitudes are uniform, then the method can move to step 1120 to increment a counter that will count the column as a positive column, which can mean that the column is indicative of an ESD event. If the ESD magnitude grouping check produces a negative result, then the method can move to step 1118 and increment a counter that indicates that the signal on the column is most likely not an ESD event.

After the column being scanned is classified as being neutral at 1114, or negative at 1118 or positive at 1118, the method can move to step 1122 to determine if there are any more columns in the touch image that are left to be scanned. If there are more columns to scan, then the process can move to step 1122 and select another column. If all the columns have been scanned, then the method can move to step 1126, where the count of positive and negative columns can be analyzed to determine if an ESD event has occurred. In one example, if the number of positive columns is greater than 0 and there are no negative columns detected, then the process can move to step 1128 and declare that an ESD event has occurred. If not then the method can move to 1130 and exit without detecting an ESD event. In other examples, a different combination of positive columns vs. negative columns can be used to act as a threshold for determining whether or not an ESD event has occurred.

In all of the ESD detection methods above, since ESD events are unlikely to happen while a user is already touching the device, the ESD detection algorithms described above can be disabled once a persistent touch has been present on the touch sensor panel.

Figure 13:
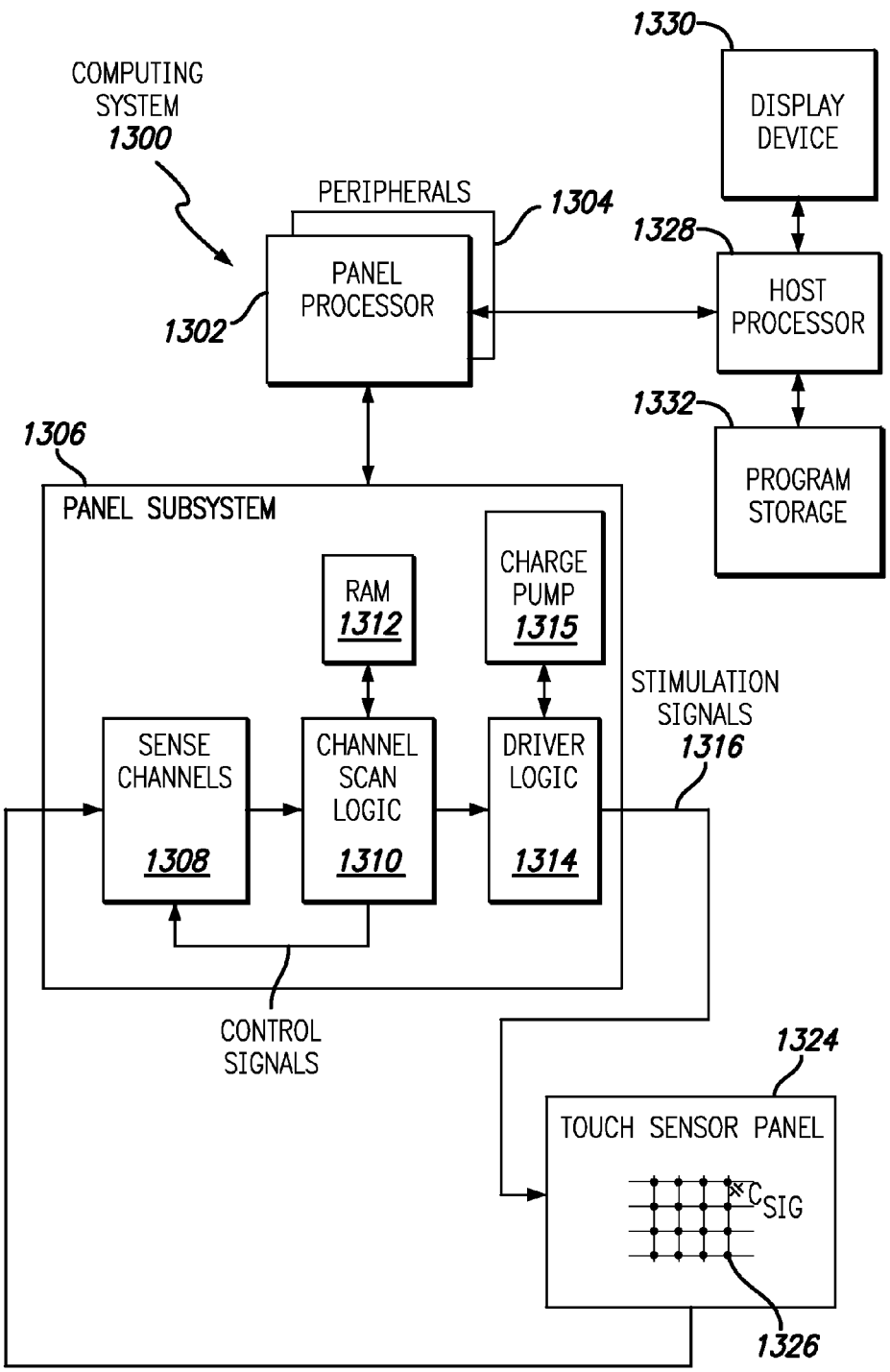
FIG. 13 illustrates exemplary computing system that can include one or more of the examples described above.

FIG. 13 illustrates exemplary computing system 1300 that can include one or more of the examples described above. Computing system 1300 can include one or more panel processors 1302 and peripherals 1304, and panel subsystem 1306. Peripherals 1304 can include, but are not limited to, random access memory (RAM) or other types of memory or storage, watchdog timers and the like. Panel subsystem 1306 can include, but is not limited to, one or more sense channels 1208 which can utilize operational amplifiers that can be configured to minimize saturation time, channel scan logic 1310 and driver logic 1314. Channel scan logic 1310 can access RAM 1312, autonomously read data from the sense channels and provide control for the sense channels including calibrating the sense channels for changes in phase correlated with a parasitic capacitance. In addition, channel scan logic 1310 can control driver logic 1314 to generate stimulation signals 1316 at various frequencies and phases that can be selectively applied to drive lines of touch sensor panel 1324. In some examples, panel subsystem 1306, panel processor 1302 and peripherals 1304 can be integrated into a single application specific integrated circuit (ASIC).

Touch sensor panel 1324 can include a capacitive sensing medium having a plurality of drive lines and a plurality of sense lines, although other sensing media can also be used. Each intersection of drive and sense lines can represent a capacitive sensing node and can be viewed as picture element (node) 1326, which can be particularly useful when touch sensor panel 1324 is viewed as capturing an "image" of touch. Each sense line of touch sensor panel 1324 can drive sense channel 1308 (also referred to herein as an event detection and demodulation circuit) in panel subsystem 1306. The drive and sense lines can also be configured to act as individual electrodes in a self-capacitance touch sensing configuration.

Computing system 1300 can also include host processor 1328 for receiving outputs from panel processor 1302 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1328 can also perform additional functions that may not be related to panel processing, and can be coupled to program storage 1332 and display device 1304 such as an LCD display for providing a UI to a user of the device. Display device 404 together with touch sensor panel 1324, when located partially or entirely under the touch sensor panel, can form touch screen 1318.

Note that one or more of the functions described above can be performed by firmware stored in memory (e.g. one of the peripherals 1304 in FIG. 13) and executed by panel processor 1302, or stored in program storage 1332 and executed by host processor 1328. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 14A:
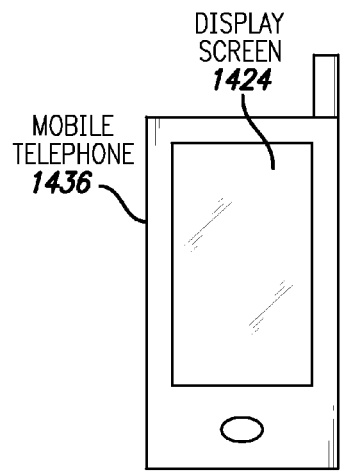
FIGS. 14a-14d illustrate various electronic devices that can include one or more of the examples described above.

FIG. 14a illustrates exemplary mobile telephone 1436 that can include touch sensor panel 1424, the touch sensor panel including circuitry to detect and distinguish the presence of an ESD from a detected touch image according to one disclosed example.

Figure 14B:
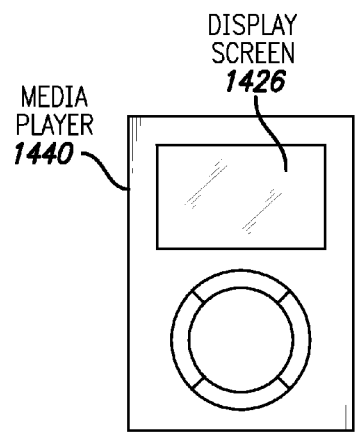

FIG. 14b illustrates exemplary digital media player 1440 that can include touch sensor panel 1426, the touch sensor panel including circuitry to detect and distinguish the presence of an ESD from a detected touch image according to one disclosed example.

Figure 14C:
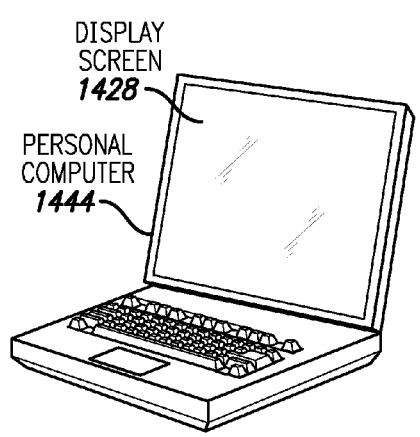

FIG. 14c illustrates exemplary personal computer 1444 that can include touch sensor panel (trackpad) 1428, the touch sensor panel and/or display of the personal computer (in examples where the display is part of a touch screen) including circuitry to detect and distinguish the presence of an ESD from a detected touch image according to one disclosed example.

Figure 14D:
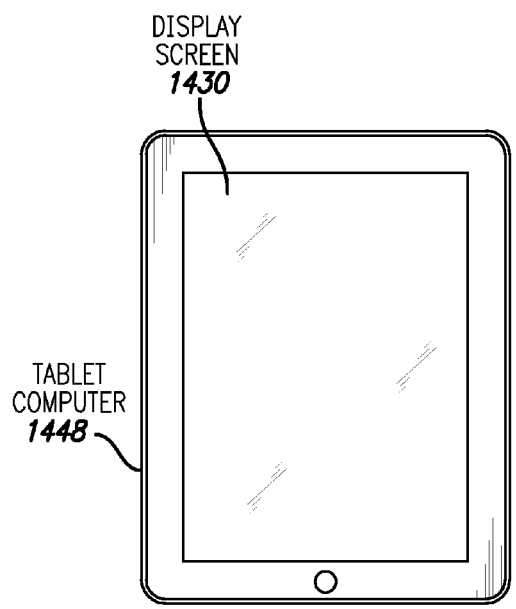

FIG. 14d illustrates exemplary tablet computer 1448 that can include touch sensor panel 1430, the touch sensor panel and/or display of the personal computer (in examples where the display is part of a touch screen) including circuitry to detect and distinguish the presence of an ESD from a detected touch image according to one disclosed example. The mobile telephone, media player and personal computer of FIGS. 14a, 14b and 14c can reduce the adverse effects on the detection of touch caused by an ESD event.

Although FIGS. 14a-d discuss a mobile telephone, a media player, a personal computer and a tablet computer respectively, the disclosure is not so restricted and the touch sensor panel can be included on a tablet computer, a television, or any other device which can benefit from the reduction of adverse effects on the detection of touch caused by an ESD event.

Therefore according to the above disclosure, some examples of the disclosure are directed to a method for detecting an occurrence of an ESD event on a touch input device, the method comprising: simultaneously applying a plurality of stimulation signals to a plurality of drive lines of a touch sensor panel, wherein the stimulation signals are applied in a multi-step sequence; acquiring a touch image of the touch sensor panel wherein the touch image consists of a plurality of sensed values; and analyzing the acquired touch image to determine a correlation of the touch image to one or more steps in the sequence of stimulation signals. Additionally or alternatively to one or more examples disclosed above, in other examples the multiple steps are stored in a matrix of vectors, the matrix having a plurality of basis vectors. Additionally or alternatively to one or more examples disclosed above, in other examples the correlation of the touch image to one or more steps in the sequence of stimulation signals further includes the touch image being correlated to one or more of the plurality of basis vectors. Additionally or alternatively to one or more examples disclosed above, in other examples the correlation between the touch image and the plurality of basis vectors is determined by comparing a first number of positive signals within the plurality of sensed values with a second number of negative signals within the plurality of sensed values. Additionally or alternatively to one or more examples disclosed above, in other examples analyzing the acquired touch image includes: analyzing a first portion of the touch image corresponding to a first group of drive lines to determine a correlation of the touch image to the one or more steps in the sequence of stimulation signals; analyzing a second portion of the touch image corresponding to a second group of drive lines to determine a correlation of the touch image to the one or more steps; and comparing the first portion of the touch image to the second portion of the touch image. Additionally or alternatively to one or more examples disclosed above, in other examples acquiring a touch image of the touch sensor panel further includes receiving a plurality of signals from a plurality of sense lines of the touch sensor panel, the plurality of signals being indicative of a change in capacitance at a plurality of touch nodes of the device. Additionally or alternatively to one or more examples disclosed above, in other examples the method further comprises disabling ESD detection when one or more user inputs have been detected by the touch sensor panel.

Additionally or alternatively to the one or more examples disclosed above, other examples of the disclosure are direct to a touch sensitive device capable of detecting the occurrence of an ESD event, the device comprising: a touch sensor panel capable of simultaneously applying a plurality of stimulation signals to a plurality of drive lines of the touch sensor panel, wherein the stimulation signals are applied in a multi-step sequence; a processor capable of acquiring a touch image of the touch sensor panel, wherein the touch image consists of a plurality of sensed values; and analyzing the acquired touch image to determine a correlation of the touch image to one or more steps in the sequence of stimulation signals. Additionally or alternatively to one or more examples disclosed above, in other examples the processor is further capable of storing the multiple steps in a matrix of vectors, the matrix having a plurality of basis vectors. Additionally or alternatively to one or more examples disclosed above, in other examples the processor is further capable of determining the correlation of the touch image to the one or more steps in the sequence of stimulation signals by correlating the touch image to one or more of the plurality of basis vectors. Additionally or alternatively to one or more examples disclosed above, in other examples the processor is further capable of determining the correlation between the touch image and the plurality of basis vectors by comparing a first number of positive signals within the plurality of sensed values with a second number of negative signals within the plurality of sensed values. Additionally or alternatively to one or more examples disclosed above, in other examples analyzing the acquired touch image includes analyzing a first portion of the touch image corresponding to a first group of rows to determine a correlation of the touch image to one or more steps in the sequence of stimulation signals; analyzing a second portion of the touch image corresponding to a second group of drive lines to determine a correlation of the touch image to the one or more steps; and comparing the first portion of the touch image to the second portion of the touch image. Additionally or alternatively to one or more examples disclosed above, in other examples acquiring a touch image of the touch sensor panel further includes receiving a plurality of signals from a plurality of sense lines of the touch input device, the plurality of signals being indicative of a change in capacitance at a plurality of touch nodes of the device. Additionally or alternatively to one or more examples disclosed above, in other examples the processor is further capable of disabling ESD detection when one or more user inputs have been detected by the touch sensor panel.

Additionally or alternatively to the one or more examples disclosed above, other examples of the disclosure are direct to a non-transitory computer readable storage medium having stored thereon a set of instructions for detecting ESD events in a touch sensor panel, that when executed by a processor causes the processor to: simultaneously apply a plurality of stimulation signals to a plurality of drive lines of a touch sensor panel, wherein the stimulation signals are applied in a multi-step sequence; acquire a touch image of the touch sensor panel wherein the touch image consists of a plurality of sensed values; and analyze the acquired touch image to determine a correlation of the touch image to one or more steps in the sequence of stimulation signals. Additionally or alternatively to one or more examples disclosed above, in other examples the processor is further capable of storing the multiple steps in a matrix of vectors, the matrix having a plurality of basis vectors. Additionally or alternatively to one or more examples disclosed above, in other examples the processor is further capable of determining the correlation of the touch image to the one or more steps in the sequence of stimulation signals by correlating the touch image to one or more of the plurality of basis vectors. Additionally or alternatively to one or more examples disclosed above, in other examples the processor is further capable of determining the correlation between the touch image and the plurality of basis vectors by comparing a first number of positive signals within the plurality of sensed values with a second number of negative signals within the plurality of sensed values. Additionally or alternatively to one or more examples disclosed above, in other examples analyzing the acquired touch image includes analyzing a first portion of the touch image corresponding to a first group of rows to determine a correlation of the touch image to one or more steps in the sequence of stimulation signals; analyzing a second portion of the touch image corresponding to a second group of drive lines to determine a correlation of the touch image to the one or more steps; and comparing the first portion of the touch image to the second portion of the touch image. Additionally or alternatively to one or more examples disclosed above, in other examples acquiring a touch image of the touch sensor panel further includes receiving a plurality of signals from a plurality of sense lines of the touch input device, the plurality of signals being indicative of a change in capacitance at a plurality of touch nodes of the device. Additionally or alternatively to one or more examples disclosed above, in other examples the processor is further capable of disabling ESD detection when one or more user inputs have been detected by the touch sensor panel.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method for detecting an occurrence of an ESD event on a touch input device, the method comprising:
   applying stimulation signals to a plurality of drive lines of a touch sensor panel, wherein the stimulation signals are applied in a multi-step sequence of stimulation signals, each step having different stimulation signals;
   acquiring a touch image of the touch sensor panel wherein the touch image comprises a plurality of sensed values based on the stimulation signals; and
   determining a correlation of the touch image to one or more of the different stimulation signals, the correlation of one or more, but fewer than all, of the different stimulation signals indicative of the ESD event.

2. The method of claim 1, wherein the multiple steps are stored in a matrix of vectors, the matrix having a plurality of basis vectors.

3. The method of claim 2, wherein the correlation of the touch image to one or more steps in the sequence of stimulation signals further includes the touch image being correlated to one or more of the plurality of basis vectors.

4. The method of claim 2, wherein the correlation between the touch image and the plurality of basis vectors is determined by comparing a first number of positive signals within the plurality of sensed values with a second number of negative signals within the plurality of sensed values.

5. The method of claim 2, wherein determining the correlation comprises:
   analyzing a first portion of the touch image corresponding to a first group of drive lines to determine a correlation of the touch image to the one or more steps in the sequence of stimulation signals;
   analyzing a second portion of the touch image corresponding to a second group of drive lines to determine a correlation of the touch image to the one or more steps in the sequence of stimulation signals; and
   comparing the first portion of the touch image to the second portion of the touch image.

6. The method of claim 1, wherein acquiring a touch image of the touch sensor panel further includes receiving a plurality of signals from a plurality of sense lines of the touch sensor panel, the plurality of signals being indicative of a change in capacitance at a plurality of touch nodes of the device.

7. The method of claim 1, further comprising disabling ESD detection when one or more sensed values have been detected by the touch sensor panel.

8. A touch sensitive device capable of detecting the occurrence of an ESD event, the device comprising:
   a touch sensor panel capable of applying stimulation signals to a plurality of drive lines of the touch sensor panel, wherein the stimulation signals are applied in a multi-step sequence of stimulation signals, each step having different stimulation signals;
   a processor capable of
      acquiring a touch image of the touch sensor panel, wherein the touch image comprises a plurality of sensed values based on the stimulation signals; and determining a correlation of the touch image to one or more of the different stimulation signals, the correlation of one or more, but fewer than all, of the different stimulation signals indicative of the ESD event.

9. The device of claim 8, wherein the processor is further capable of storing the multiple steps in a matrix of vectors, the matrix having a plurality of basis vectors.

10. The device of claim 9, wherein the processor is further capable of determining the correlation of the touch image to the one or more steps in the sequence of stimulation signals by correlating the touch image to one or more of the plurality of basis vectors.

11. The device of claim 10, wherein the processor is further capable of determining the correlation between the touch image and the plurality of basis vectors by comparing a first number of positive signals within the plurality of sensed values with a second number of negative signals within the plurality of sensed values.

12. The device of claim 9, wherein determining the correlation comprises:
analyzing a first portion of the touch image corresponding to a first group of rows to determine a correlation of the touch image to one or more steps in the sequence of stimulation signals;
analyzing a second portion of the touch image corresponding to a second group of drive lines to determine a correlation of the touch image to the one or more steps in the sequence of stimulation signals; and
comparing the first portion of the touch image to the second portion of the touch image.

13. The device of claim 8, wherein acquiring a touch image of the touch sensor panel further includes receiving a plurality of signals from a plurality of sense lines of the touch sensor panel, the plurality of signals being indicative of a change in capacitance at a plurality of touch nodes of the touch sensor panel.

14. The device of claim 8, wherein the processor is further capable of disabling ESD detection when one or more of the plurality of signals from the plurality of sense lines have been detected by the touch sensor panel.

15. A non-transitory computer readable storage medium having stored thereon a set of instructions for detecting ESD events in a touch sensor panel, that when executed by a processor causes the processor to:
apply stimulation signals to a plurality of drive lines of a touch sensor panel, wherein the stimulation signals are applied in a multi-step sequence of stimulation signals, each step having different stimulation signals;
acquire a touch image of the touch sensor panel wherein the touch image comprises a plurality of sensed values based on the stimulation signals; and
determining a correlation of the touch image to one or more of the different stimulation signals, the correlation of one or more, but fewer than all, of the different stimulation signals indicative of the ESD event.

16. The non-transitory computer readable storage medium of claim 15, wherein the multiple steps are stored in a matrix of vectors, the matrix having a plurality of basis vectors.

17. The non-transitory computer readable storage medium of claim 16, wherein the correlation of the touch image to one or more steps in the sequence of stimulation signals further includes the touch image being correlated to one or more of the plurality of basis vectors.

18. The non-transitory computer readable storage medium of claim 16, wherein the correlation between the touch image and the plurality of basis vectors is determined by comparing a first number of positive signals within the plurality of sensed values with a second number of negative signals within the plurality of sensed values.

19. The non-transitory computer readable storage medium of claim 15, wherein determining the correlation comprises:
analyzing a first portion of the touch image corresponding to a first group of drive lines to determine a correlation of the touch image to the one or more steps in the sequence of stimulation signals;
analyzing a second portion of the touch image corresponding to a second group of drive lines to determine a correlation of the touch image to the one or more steps in the sequence of stimulation signals; and
comparing the first portion of the touch image to the second portion of the touch image.

20. The non-transitory computer readable storage medium of claim 15, wherein acquiring a touch image of the touch sensor panel further includes receiving a plurality of signals from a plurality of sense lines of the touch sensor panel, the plurality of signals being indicative of a change in capacitance at a plurality of touch nodes of the device.

21. The non-transitory computer readable storage medium of claim 15, wherein the processor is further caused to disable ESD detection when one or more sensed value have been detected by the touch sensor panel.

22. A touch sensitive device capable of detecting the occurrence of an ESD event, the device comprising:
a touch sensor panel capable of applying stimulation signals to a plurality of drive lines of the touch sensor panel, wherein the stimulation signals are applied in a multi-step sequence of stimulation signals, each step having different stimulation signals;
a processor capable of
storing a representation of the stimulation signals as a matrix of vectors having a plurality of base vectors;
acquiring a touch image of the touch sensor panel, wherein the touch image comprises a plurality of sensed values for touch pixels of the touch panel based on the stimulation signals; and
determining if a tolerance of the acquired touch image for at least one of the base vectors is below a predetermined value, the tolerance based on a difference in amplitude of sensed values of adjacent touch pixels of the touch panel.

23. The method of claim 1 wherein applying the stimulation signals is performed by applying a given stimulation signal simultaneously to the plurality of the drive lines.

24. The method of claim 23, wherein determining the correlation of the touch image to one or more of the different stimulation signals comprises determining the correlation of the touch images from all of the stimulation signals in the multi-step sequence, the most strongly correlated touch image indicative of the ESD event.

25. The device of claim 8 wherein applying the stimulation signals is performed by applying a given stimulation signal simultaneously to the plurality of the drive lines.

26. The device of claim 25, wherein determining the correlation of the touch image to one or more of the different stimulation signals comprises determining the correlation of the touch images from all of the stimulation signals in the multi-step sequence, the most strongly correlated touch image indicative of the ESD event.

27. The non-transitory computer readable storage medium of claim 15 wherein applying the stimulation signals is performed by applying a given stimulation signal simultaneously to the plurality of the drive lines.

28. The non-transitory computer readable storage medium of claim 27, wherein determining the correlation of the touch image to one or more of the different stimulation signals comprises determining the correlation of the touch images from all of the stimulation signals in the multi-step sequence, the most strongly correlated touch image indicative of the ESD event.

29. The device of claim 22 wherein applying the stimulation signals is performed by applying a given stimulation signal simultaneously to the plurality of the drive lines.

30. The device of claim 29, wherein determining the correlation of the touch image to one or more of the different stimulation signals comprises determining the correlation of the touch images from all of the stimulation signals in the multi-step sequence, the most strongly correlated touch image indicative of the ESD event.

* * * * *

UNITED STATES PATENT AND TRADEMARK OFFICE
CERTIFICATE OF CORRECTION

| | |
|---|---|
| PATENT NO. | : 9,075,481 B2 |
| APPLICATION NO. | : 13/710318 |
| DATED | : July 7, 2015 |
| INVENTOR(S) | : David H. C. Shih et al. |

It is certified that error appears in the above-identified patent and that said Letters Patent is hereby corrected as shown below:

At column 20, claim 21, line 25, delete the word "value" and insert -- values --.

Signed and Sealed this
Fifth Day of January, 2016

Michelle K. Lee
*Director of the United States Patent and Trademark Office*